(12) United States Patent
Roberts et al.

(10) Patent No.: US 8,078,578 B2
(45) Date of Patent: Dec. 13, 2011

(54) SHARING OF PRESENCE-BASED TIME-ZONE INFORMATION

(75) Inventors: Wendy J. Roberts, San Francisco, CA (US); Shamim S. Pirzada, San Jose, CA (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1402 days.

(21) Appl. No.: 11/250,952

(22) Filed: Oct. 14, 2005

(65) Prior Publication Data

US 2007/0088818 A1    Apr. 19, 2007

(51) Int. Cl.
*G06F 7/00* (2006.01)
*G06F 17/00* (2006.01)

(52) U.S. Cl. ........................................ 707/620
(58) Field of Classification Search .................. 707/200, 707/620, 999.2
See application file for complete search history.

(56) References Cited

U.S. PATENT DOCUMENTS

| | | | |
|---|---|---|---|
| 5,920,824 A * | 7/1999 | Beatty et al. .................. 455/425 |
| 6,694,007 B2 | 2/2004 | Lang et al. .................... 379/222 |
| 6,970,547 B2 * | 11/2005 | Andrews et al. ......... 379/210.01 |
| 7,023,881 B1 * | 4/2006 | Bendak et al. ................ 370/470 |
| 2002/0136390 A1 | 9/2002 | Lang et al. .................... 379/222 |
| 2002/0143876 A1 | 10/2002 | Boyer et al. .................. 709/205 |
| 2002/0143877 A1 | 10/2002 | Hackbarth et al. ............ 709/205 |
| 2002/0147777 A1 | 10/2002 | Hackbarth et al. ............ 709/205 |
| 2003/0110220 A1 | 6/2003 | Lapstun et al. ................ 709/204 |
| 2004/0059941 A1 | 3/2004 | Hardman et al. .............. 713/201 |
| 2004/0078490 A1 * | 4/2004 | Anderson et al. ............. 709/245 |
| 2004/0203901 A1 * | 10/2004 | Wilson et al. .............. 455/456.1 |
| 2004/0245345 A1 | 12/2004 | Silverbrook et al. ......... 235/491 |
| 2005/0052409 A1 | 3/2005 | Lapstun et al. ................ 345/156 |
| 2005/0052683 A1 | 3/2005 | Silverbrook et al. ........ 358/1.14 |
| 2005/0056692 A1 | 3/2005 | Paul et al. ..................... 235/375 |
| 2006/0178109 A1 * | 8/2006 | Takiguchi .................... 455/41.1 |
| 2007/0015521 A1 * | 1/2007 | Casey ........................ 455/456.3 |

OTHER PUBLICATIONS

RPID: Rich Presence Extensions to the Presence Information Data Format (PIDF); draft-ietf-simple-rpid-04; H. Schulzrinne, Columbia U.; V. Gurbani, Lucent; P. Kyzivat, J. Rosenberg, Cisco; pp. 1 to 31, Oct. 25, 2004.

* cited by examiner

*Primary Examiner* — Mohammad Ali
*Assistant Examiner* — Alexey Shmatov
(74) *Attorney, Agent, or Firm* — Baker Botts L.L.P.

(57) ABSTRACT

A system for sharing presence-based time-zone information includes a database, and a controller. The database includes a plurality of presence profiles, each presence profile maintaining, for an associated network user, one or more network device identifiers and, for each network device identifier, a current presence status, indicating network availability, and current time-zone information based on geographic location. The controller is able to receive presence information, determine a matching one of the presence profiles, update the current presence status and the current time-zone information in the matching one of the presence profiles, generate shifted time-zone information, generate a presence update, identify a subscriber address for receiving the presence update, and transmit the presence update to the subscriber address.

28 Claims, 4 Drawing Sheets

SHARING OF PRESENCE-BASED TIME-ZONE INFORMATION

TECHNICAL FIELD OF THE INVENTION

The present invention relates generally to sharing network presence information, and more particularly to sharing presence-based time-zone information.

BACKGROUND OF THE INVENTION

Network system users interact and communicate using various types of network communication devices, such as desktop computers, laptop computers, personal digital assistants, tablet computers, set-top boxes, desktop phones, and cell phones. These network system users can use these network communication devices to communicate to and from many parts of the globe. As networks continue to grow, economies become more global in nature, and international travel becomes more commonplace, real-time communication with network system users is taking place on an increasingly global spectrum. In order to ensure that network system users can stay in touch, despite extensive travel, it is common for these network system users to use devices that allow them to remain connected to a network, through which they can continue to receive electronic communications.

SUMMARY OF THE INVENTION

In accordance with the present invention, techniques for sharing presence-based time-zone information are provided. Presence, generally, is the ability to learn or know the network status of one or more network system users. Some embodiments of the present invention can enable subscribers to receive or access presence information for communication devices associated with one or more network system users. The presence information includes an indication of the current time zone in which a communication device is located. In certain embodiments, these techniques can enable subscribers to determine the current time of day for a network system user. Certain embodiments may also enable a subscriber to determine when would be a good time to communicate with the network system user, based on the current time-zone location of a network system user's communication device. In addition, network system users can utilize multiple levels of presence information, and identify which subscribers are authorized to access each level. Certain embodiments may enable a subscriber to determine a range of times during which a system user is likely to be available. The present invention also provides techniques for masking the current time-zone location of a communication device, so that the subscriber can only determine the geographic location of the communication device with reduced accuracy.

According to a particular embodiment, a system for sharing location information includes a database and a controller. The database includes a plurality of presence profiles, each presence profile maintaining, for an associated network user, one or more network device identifiers and, for each network device identifier, a current presence status, indicating network availability, and current time-zone information based on geographic location. The controller is able to receive presence information indicating a specific network device identifier, substantially real-time presence status, and substantially real-time time-zone information; determine a matching one of the presence profiles having a network device identifier matching the specific network device identifier; update the current presence status and the current time-zone information for the specific network device identifier in the matching one of the presence profiles using the substantially real-time presence status and the substantially real-time time-zone information; generate shifted time-zone information by shifting the current time-zone information for the specific network device identifier in the matching one of the presence profiles by an amount determined using a shifting algorithm; generate a presence update indicating the specific network device identifier, the current presence status, and the shifted time-zone information from the matching one of the presence profiles; identify a subscriber address for receiving the presence update; and transmit the presence update to the subscriber address.

Embodiments of the invention provide various technical advantages. For example, these techniques may allow a subscriber to obtain information on the current time-zone location of a network system user. Such information may enable the subscriber to better determine when or how to contact the network system user. For example, if a network system user is currently located in a time zone where the current time is two o'clock in the morning, a subscriber may prefer to send the network system user an e-mail rather than attempting to contact the network system user via telephone. In addition, time-zone information for a single network system user may be useful when combined with time-zone information for other network system users. For example, if a subscriber is attempting to coordinate an online meeting for multiple network system users, the meeting will be easier to coordinate if the subscriber knows which time zones each of the network system users is located in. Using the time-zone information, together with knowledge of local work schedules, the subscriber may be able to determine a suitable meeting time. These techniques may also allow a subscriber to determine a times during which a system user is likely to be available. These availability times may be adjusted based on current time-zone information, so that they will more accurately reflect the availability of the system user, regardless of any travel by the system user. As another example, these techniques may allow for privacy and security measures by masking the time-zone location of a communication device through random shifting or other methods. Through the use of these techniques, network administrators or network system users may improve communication efficiency without revealing information that is intended to be kept secret or private.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
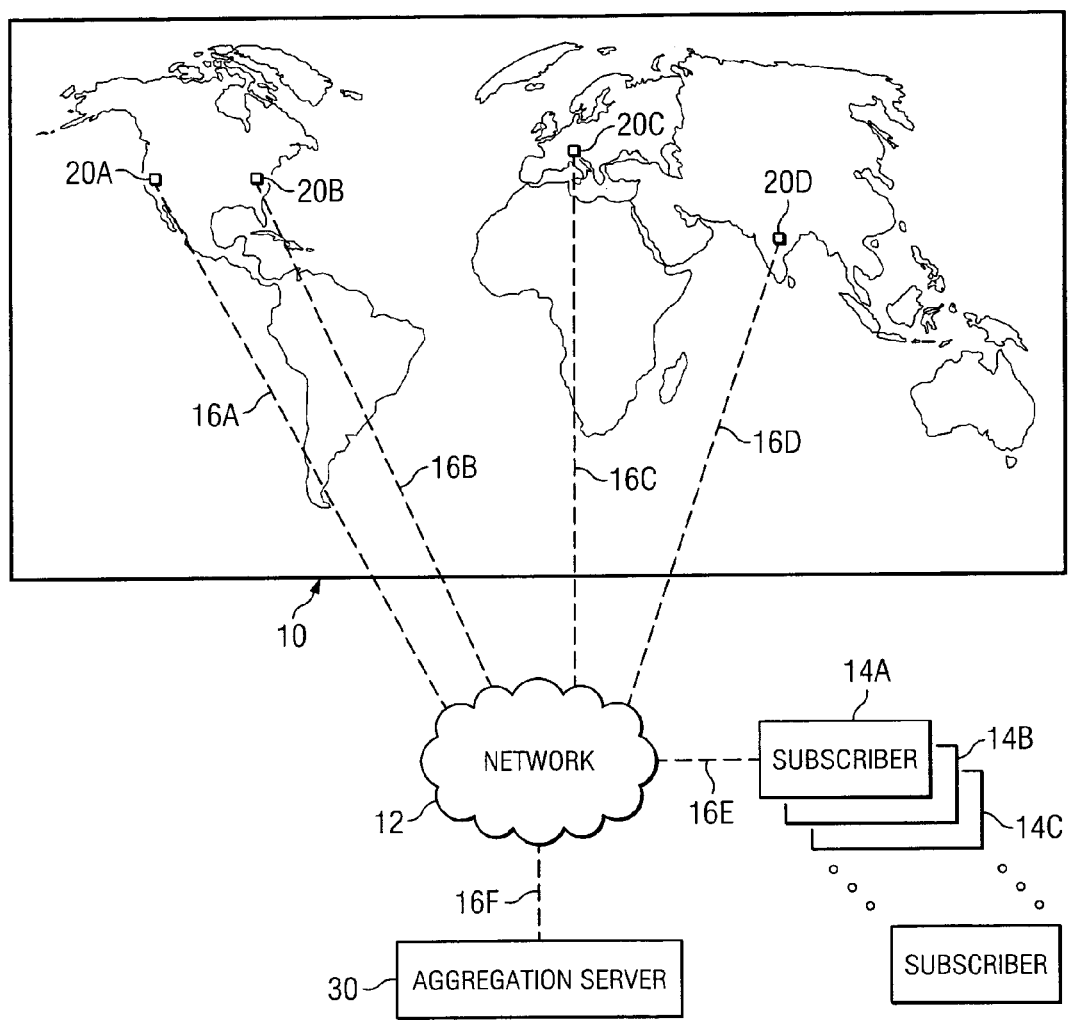
FIG. 1 illustrates a networking system having elements to support the sharing of presence-based time-zone information.

FIG. 1 illustrates a presence-enabled network system, indicated generally at 10, that includes network 12, network system users 20, subscribers 14, network connections 16, and aggregation server 30. The elements of system 10 can operate to transmit information to aggregation server 30 which can be used to maintain and update presence profiles for each network system user 20. The presence profiles can include current time-zone information for one or more communication devices associated with each network system user 20. As aggregation server 30 receives information related to the current connectivity status and/or the current location of a communication device, aggregation server 30 analyzes the information received to determine whether one or more presence profiles need to be updated. If, the aggregation server determines that one or more presence profiles need to be updated, aggregation server can update the appropriate presence profiles, identify subscribers 14 associated with those presence profiles, and then send presence profile update notices to identified subscribers 14. Accordingly, the elements of presence-enabled network system 10 can provide near-real-time information to certain identified subscribers 14, indicating the current time-zone location for one or more network system users 20.

Network system users 20 represent one or more individuals who communicate using one or more communication devices that transmit communication signals through network 12. These communication signals may support analog or digital voice communications, text messaging, electronic mail, video streams, file transfers, or any other communication signals capable of transmission via network 12. According to particular embodiments, each communication device, used by network system user 20 can be identified and associated with one or more network system users 20.

Network 12 represents communication equipment, including hardware and any appropriate controlling logic, for interconnecting elements coupled to network 12. Thus, network 12 may represent a local area network (LAN), a metropolitan area network (MAN), a wide area network (WAN), and/or any other appropriate form of network. Network 12 may include network elements such as routers, switches, converters, hubs, and splitters. Furthermore, elements within network 12 may utilize circuit-switched and/or packet-based communication protocols to provide for network services. For example, elements within network 12 may utilize Internet protocol. In addition, elements within network 12 may utilize wireless standards, such as the 802.11 family of wireless standards. As illustrated, network 12 couples to network system users 20, subscribers 14, and aggregation server 30 through the use of a plurality of network connections 16.

Aggregation server 30 represents hardware and controlling logic for collecting, processing, storing, and communicating network system user presence information. Aggregation server 30 couples to network 12 via network connection 16, and operates to support the sharing of presence-based time-zone information. Further description of aggregation server 30 is included below in relation to FIG. 3.

Subscriber 14 represents an individual, or group of individuals, who has requested and/or has obtained permission to receive presence information for one or more network system users 20. Subscriber 14 receives or accesses presence information for network system user 20 from aggregation server 30 via network 12 and network connections 16. Although not necessary, subscriber 14 may be a network system user 20 as well.

Network connection 16, represents hardware for connecting network 12 to other elements of presence-enabled system 10 and may include wireless and/or wireline elements. Although not explicitly shown in FIG. 1, elements of presence-enabled system 10 may couple directly to network 12, without the use of network connections 16.

In operation, aggregation server 30 maintains presence profiles for one or more communication devices associated with one or more network system users 20. The presence profiles contain information indicating the reported connectivity status for communication devices associated with network system users 20. The presence profiles also include information indicating the reported time-zone location for network system user 20. In addition, aggregation server 30 maintains subscriber data indicating which subscribers are authorized to receive updates for each presence profiles.

In one embodiment, aggregation server 30 receives information related to the current connectivity status and/or time-zone location of communication device 22 associated with network system user 20. Aggregation server then analyzes the received information to determine whether it is necessary to update one or more presence profiles, based on the received information. If aggregation server 30 determines that it is necessary to update a presence profile, aggregation server 30 updates the presence profile, generates a presence profile update notice, identifies the subscribers 14 that are authorized to receive updates for that presence profile, and sends the presence profile update notice to those subscribers 14.

In another embodiment, network system user 20 and/or a network administrator may establish one or more availability times associated with network system user 20. Information associated with the one or more availability times may be transmitted to and/or stored in aggregation server 30. In this embodiment, a presence profile update notice may identify a range of times in which network system user 20 is available to receive communications through the use of one or more communication devices. Additionally, the availability times may be associated with one or more network system users 20 or they may be associated with one or more communication devices, allowing a single network system user 20 to be associated with multiple availability times, each for different communication devices.

In yet another embodiment, rather than generating and sending presence profile update notices, aggregation server 30 updates the presence profile and does not generate or send a presence profile update notice. In this embodiment, authorized subscribers 14 access the presence profile as needed to retrieve the updated information.

Although the connectivity status and/or time-zone information received by aggregation server is intended to be as accurate as possible, in certain embodiments network system user 20 or a network administrator may send intentionally inaccurate information to disguise the actual connectivity status and/or time-zone location of one or more communication devices 22. In this embodiment, communication device 22 may transmit network traffic with intentionally inaccurate information attached. Alternatively, network system user 20 or a network administrator may send a message to aggregation server 30, instructing aggregation server 30 to ignore any received information related to the connectivity status and/or time-zone location of one or more communication devices 22 and to update one or more presence profiles according to certain instructions.

Figure 2:
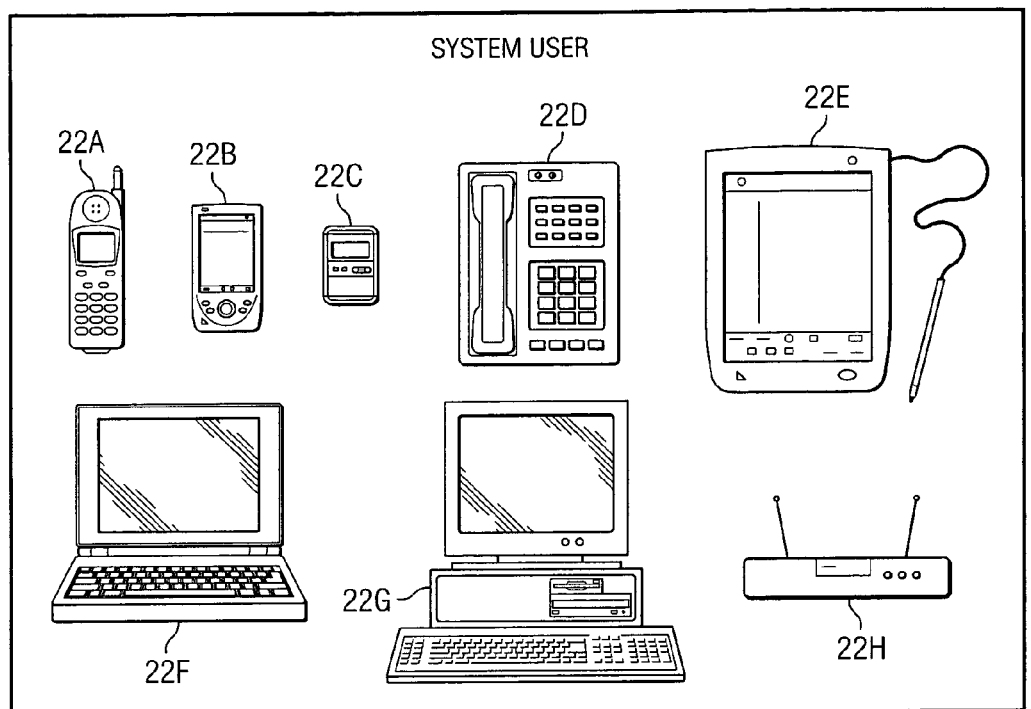
FIG. 2 is a diagram illustrating communication devices associated with a network system user.

FIG. 2 is a diagram illustrating communication devices 22 associated with network system user 20. Communication devices 22 represent one or more hardware devices capable of transmitting communications through network 12. Communication devices 22 may represent portable or fixed location devices capable of transmitting communications through one or more appropriate wireless or wireline protocols. For example, communication devices 22 may include cellular phones 22A, personal digital assistants (PDA's) 22B, two-way pagers 22C, desk phones 22D, tablet computers 22E, laptop computers 22F, desktop computers 22G, television set-top boxes 22H, etc. Additionally, communication devices 22 may connect using one or more mobile communication technologies, such as global systems for mobile communications (GSM) and/or code division multiple access (CDMA). Furthermore, communication devices 22 may support packet based protocols such as Internet protocol (IP) and wireless standards such as the 802.11 family of wireless standards. In certain embodiments, network system user 20 may be associated with numerous communication devices 22, all of which transmit communication signals through network 12. All communication devices 22, associated with a single network system user 20, may be located in the same time zone; or, alternatively, some communication devices 22 associated with network system user 20 may be located in different time zones. The time-zone location of communication device 22 may remain fixed, or may change over time, due to a change in physical location.

In operation, network system user 20 connects to network 12 through one or more network communication devices 22. In some instances, network system user 20 may be connected to network 12 using multiple communication devices 22 simultaneously. For example, network system user 20 may simultaneously be working on desktop computer 22G, talking on desktop phone 22D, and receiving a call on a cellular phone 22A.

In one embodiment, network communication device 22 can determine its own current time-zone location. Communication device 22 may use global positioning systems (GPS), network registration data, port address information, or other means to determine its own current time-zone location. This information can then be transmitted to aggregation server 30. Alternatively, the current time-zone location of communication device 22 may be identified based on information contained within network traffic generated by communication device 22, or on information generated by elements within network 12 or a separate external network.

Figure 3:
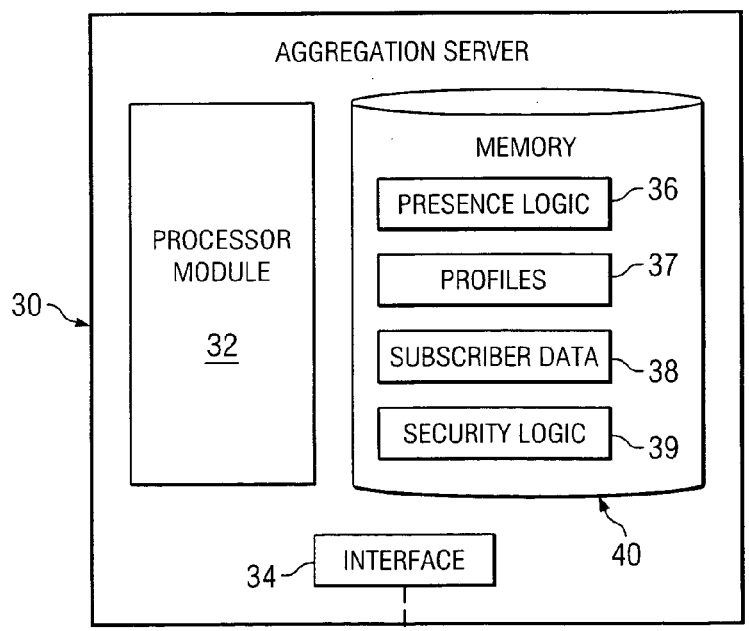
FIG. 3 is a block diagram illustrating functional components of an aggregation server associated with the presence-enabled network.

FIG. 3 is a block diagram illustrating functional components of aggregation server 30. In the embodiment illustrated, aggregation server 30 includes processor module 32, network interface 34, and memory 40. These components operate to enable aggregation server 30 to maintain and update presence profiles containing time-zone information.

Processor module 32 controls the operation and administration of elements within aggregation server 30 by processing information received from network interface 34 and memory 40. Processor module 32 includes any hardware and/or controlling logic elements operable to control and process information. For example, processor 32 may be a programmable logic device, a microcontroller, and/or any other suitable processing device or group of devices.

Network interface 34 communicates information to and receives information from devices coupled to aggregation server 30. For example, network interface 34 may communicate with network communication devices 22, subscribers 14, and other elements included within network 12. Thus network interface 34 includes any suitable hardware and/or controlling logic used to communicate information to and from elements coupled to aggregation server 30.

Memory 40 stores, either permanently or temporarily, data and other information for processing by processor module 32 and communication using network interface 34. Memory 40 includes any one or a combination of volatile or nonvolatile local or remote devices suitable for storing information. For example, memory 40 may include random access memory (RAM), read only memory (ROM), magnetic storage devices, optical storage devices, or any other suitable information storage device or combination of these devices.

Memory 40 may store, among other things, presence logic 36, presence profiles 37, subscriber data 38, and security logic 39. Presence logic 36 includes code, executable files, and/or appropriate software modules capable, when executed, of controlling the operation of aggregation server 30 as it relates to updating presence profiles 37, including time-zone location information and/or availability times. Presence logic 36 includes logic necessary to receive and analyze presence information, update presence profiles 37, identify subscribers 14 associated with the presence profiles 37, generate presence profile update notices, and send the presence profile update notices to the identified subscribers 14.

Presence profiles 37 may include addresses and protocols for each communication device 22, as well as current presence status, time-zone location information, schedule information, availability times, preferences, and any other information that may assist aggregation server 30 in identifying the current network presence status and time-zone location of communication device 22 associated with network system user 20. Time-zone information may include a time zone or a geographic location that can be correlated to a time zone. Alternatively, time-zone information may include a current time at the location where the communication device is located or an offset from a known standard time, where the known standard time could be, for example, Greenwich Mean Time, the time where the aggregation server is located, where a principal office is located, or a designated "home" location for network system user 20.

In one embodiment, network system user 20 and/or a network administrator may establish one or more availability times associated with system user 20. Information associated with the one or more availability times may be included in one or more presence profiles 37. For example, network system user 20 may identify the range of time from 8:00 a.m. to 5:00 p.m. as being available times for receiving communications through a particular communication device 22, such as cell phone 22A. Once an availability time has been established, it may be updated by network system user 20 and/or a network administrator. Availability times may also change as a result of a change in the current time-zone location of system user 20 and/or communication device 22. For example, if network system user 20 and subscriber 14 are initially located in a first area operating under Eastern Standard Time (EST), and network system user 20 travels to a second area operating under Pacific Standard Time, then the reported availability time may be changed to indicate the new time-zone location. Accordingly, if the availability time reported to subscriber 14 was initially 8:00 a.m. to 5:00 p.m. (EST) while network system user 20 was located in the first area, then the availability time might change to 11:00 a.m. to 8:00 p.m. (EST) when the system user travels to the second area.

Subscriber data 38 may include information identifying each subscriber 16, the presence profiles 37 each subscriber 14 is authorized to access, and the type of profile information each subscriber 14 is authorized to access for each network system user 20. Subscriber data 38 may also include contact information for each subscriber 14 to allow aggregation server 30 to transmit updated presence profile information to certain subscribers 14.

Security logic 39 includes code, executable files, and/or appropriate software modules capable, when executed, of controlling the access to or distribution of presence profile information. Security logic 39 includes logic necessary to authorize access to presence profiles by subscribers 14, to designate subscribers 14 authorized to receive presence profile update notices. In operation, network system user 20 may transmit authorization information to aggregation server 30 indicating which subscribers 14 are authorized to access or receive presence profile information. In certain embodiments, authorization information is transmitted by a network administrator. Aggregation server 30 then receives this authorization information, analyzes the received information, and, if necessary, updates subscriber data 38. Security logic 39 may then establish content encryption keys that are only accessible to certain subscribers 14 based on updated subscriber data 38. Subscribers 14 may then use these content encryption keys to access presence profiles 37, or to decrypt presence profile update notices.

Security logic 39 may also include logic necessary to mask the actual time-zone location of communication devices 22 associated with network system user 20. In certain embodiments, security logic 39 may include one or more shifting algorithms to mask the location of communication devices 22. The one or more shifting algorithms may include randomization logic and may vary the amount, direction, and/or frequency of the shifting. For example, a shifting algorithm may enable random shifting of time-zone information for a particular communication device 22, by shifting the time-zone information randomly within a range of two time-zones in either direction on a daily basis. In certain embodiments, the shifting algorithm may operate to shift the time-zone information by a fraction of a time-zone. Although such a shift may result in a nonsensical result, it may effectively serve to masking the actual location of communication device 22 or network system user 20. In certain embodiments, a shifting algorithm may be limited to certain time-zones where a communication device 22 or network system user 20 has previously been located. In other embodiments, a shifting algorithm may be limited to those time-zones associated with a specified group of continents, countries, or states.

In certain embodiments, security logic 39 may associate each time zone with one of a plurality of time-zone blocks, wherein each time-zone block is associated with one or more time-zones and wherein each time-zone block has a representative time-zone value. In these embodiments, a shifting algorithm may operate to compare the time-zone information for a particular communication device 22 to the plurality of time-zone blocks, identify one of the plurality of time-zone blocks based on the comparison, and shift the time-zone information for the communication device 22 based on the time representative time-zone value of the identified one of the plurality of time-zone blocks. For example, in a particular embodiment, the plurality of time-zone blocks may include a time-zone block associated with the United States, and the United States time-zone block may have a representative time-zone value that is equivalent to central standard time. In alternative embodiments, the exemplary United States time-zone block could have any other appropriate time-zone value, and could have a representative time-zone value that is a fraction. For example, the exemplary United States time-zone block could have an associated time-zone value that is equivalent to halfway between Central Standard Time and Mountain Standard Time.

In one embodiment, network system user 20, or a network administrator, may identify multiple levels of presence information that may be transmitted to, or accessed by, subscribers 14. For example, network system user 20 may create three tiers of presence information that may be shared with subscribers 14, and then designate which subscribers 14 are associated with each tier of presence information. Tier I may represent the most complete and accurate information, and reflect the actual reported connectivity status and time-zone location information as it is maintained in presence profile 37. As an example, network system user 20 may associate subscribers 14 who are friends and family of network system user 20 with Tier I presence information. Thus, only those subscribers 14 associated with Tier I would have access to the most accurate presence information for network system user 20. Similarly, Tier II may represent a less complete version of the presence information for network system user 20. For example, Tier II information may only include connectivity status and time-zone location information for network system user 20 during scheduled work hours on scheduled work days. As an example, network system user 20 may associate subscribers 14 who are co-workers with Tier II presence information. Finally, Tier III may represent a less accurate version of the presence information of network system user 20. For example, Tier III may represent connectivity status and time-zone location information for network system user 20 with a randomly selected amount of error added to the information. Accordingly, Tier III presence information may indicate that a communication device 22 associated with network system user 20 is one or more time zones away from its actual reported time zone, as maintained in the associated presence profile 37. In addition, Tier III presence information may indicate that a communication device 22 has established an active network connection with network 12 at a time sometime after the actual connection was reported. As an example, network system user 20 may associate subscribers 14 who are external business contacts with Tier III presence information. Thus, subscribers who are only associated with Tier III presence information would be able to access connectivity status and time-zone location information for network system user 20 and, while the information would reveal the general location of network system user 20, it would not accurately reflect the actual location of network system user 20.

In another embodiment, network system user 20 and/or a network administrator may identify different availability times for different communication devices 22 and/or for different tiers of subscribers 14. For example, different availability times may be established for each tier of subscribers.

Although presence enabled system 10 has been described as having three tiers of information, presence enabled system 10 may have any number of tiers and those tiers may be associated with any number of subscribers 14, based on the preferences of network system user 20, or upon the preferences of one or more network administrators.

Figure 4:
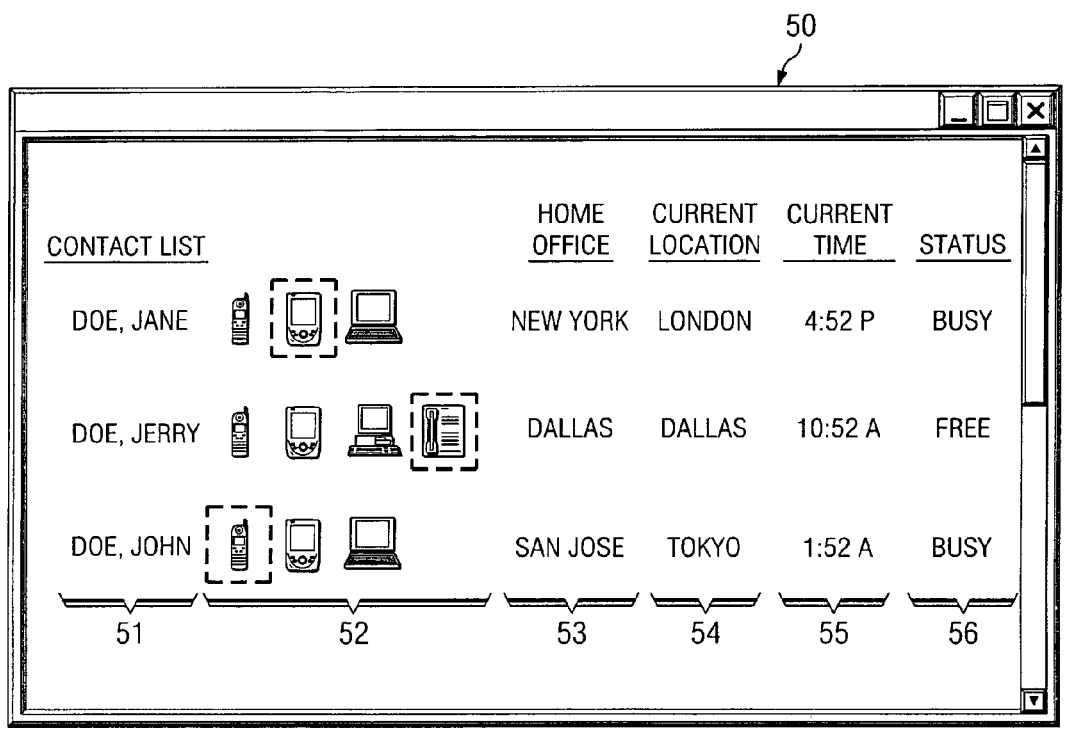
FIG. 4 illustrates an example graphical user interface for sharing presence-based time-zone information.

FIG. 4 illustrates just one example of a graphical user interface 50 for sharing presence-based time-zone information. Graphical user interface 50 includes contact list 51, which may contain a series of system-user icons. The system-user icons each represent one or more network system users 20, and may be in the form of a picture, drawing, alphanumeric text, or other graphical indicator. For each individual or group of network system users 20 associated with a system-user icon in contact list 51, graphical user interface 50 may include connectivity information 52, home office information 53, current location information 54, current time information 55, and status 56. Connectivity information 52 may include icons or other display methods to indicate the current connectivity status of network system user 20. For example, connectivity information 52 may indicate which communication devices 22 are associated with network system user 20, and which particular communication device 22 is currently connected to network 12. Connectivity information 22 may also indicate which communication device 22 is the preferred device for communicating with network system user 20. Home office information 53 and current location information 54 respectively provide information on the home office and the current location of network system user 20. Additionally, current time information 55 may provide an indication of the current local time at the current location of network system user 20. Alternatively, in other embodiments, graphical user interface may provide a time offset from the current local time of subscriber 14, or may provide the current time-zone location of network system user 20. For example, current time information 44 may indicate "+6 hours", "−2 hours", "GMT+2 hours", etc. Status 56 may indicate a current availability status of network system user 20. For example, status 56 may indicate that network system user 20 is available, free, busy, out-of-the-office, on vacation, etc. In certain embodiments, some or all of the information displayed in graphical user interface 50 may not be available for each network system user 20 included in contact list 51.

Although graphical user interface 50 has been shown with the above listed features and capabilities, in other embodiments, graphical user interface 50 may include some, none, or all of these features. For example, in certain embodiments, graphical user interface 50 may include an indication of available times associated with a system-user icon, a network system user, and or a communication device 22. Accordingly, graphical user interface 50 may include an indication that a particular communication device 22 will be available from 8:00 a.m. to 5:00 p.m., until 5:00 p.m., for the next three hours, or not until 8:00 a.m.

Figure 5:
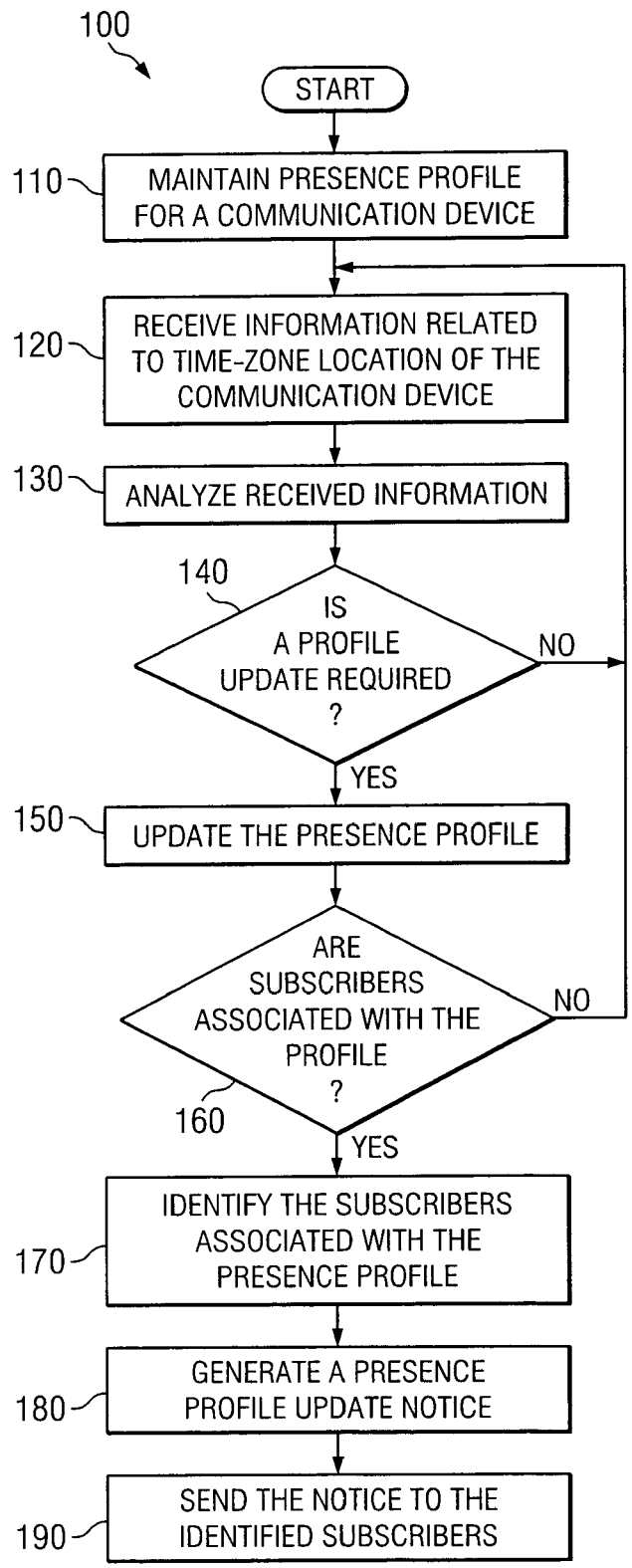
FIG. 5 is a flowchart illustrating a method for sharing presence-based time-zone information.

FIG. 5 is a flowchart illustrating a method, indicated generally at 100, for sharing presence-based time-zone information. Aggregation server 30 maintains a presence profile 37 for a communication device 22, at step 110. Aggregation server 30 then receives information related to the time-zone location of the communication device 22, at step 120. After receiving the time-zone location information at step 120, aggregation server 30 analyzes the received information at step 130. Aggregation server 30 determines at step 140 whether an update is required for presence profile 37. If an update is required aggregations server 30 updates presence profile 37, at step 150. Aggregation server 30 then determines, at step 160, whether any subscribers 14 are associated with presence profile 37. If there are subscribers 14 associated with presence profiles 37, then aggregation server identifies those subscribers at step 170. Aggregation server 30 generates a presence profile update notice at step 180, and then sends the presence profile update notice to the identified subscribers 14 at step 190.

Thus, method 100 represents a series of steps for sharing presence-based time-zone information. Method 100 represents an example of one mode of operation, and system 10 contemplates devices using suitable techniques, elements and applications for performing this method of operation. Many of the steps in the flowchart may take place simultaneously and/or in a different order than shown. In addition, the devices may use any methods with additional or fewer steps to share presence-based time-zone information, so long as the method remains appropriate. Moreover, other devices of system 10 may perform similar techniques to support the sharing of presence-based time-zone information.

Although the present invention has been described in several embodiments, a plenitude of changes and modifications may be suggested to one skilled in the art, and it is intended that the present invention encompass such changes and modifications as fall within the present appended claims.

What is claimed is:

1. A system for sharing location information comprising:
 a database comprising a plurality of presence profiles, each presence profile maintaining, for an associated network user, one or more network device identifiers and, for each network device identifier, a current presence status indicating network availability, and current time-zone information based on geographic location; and
 a controller operable to:
  receive presence information indicating a specific network device identifier, substantially real-time presence status, and substantially real-time time-zone information;
  determine a matching one of the presence profiles having a network device identifier matching the specific network device identifier;
  update the current presence status and the current time-zone information for the specific network device identifier in the matching one of the presence profiles using the substantially real-time presence status and the substantially real-time time-zone information;
  mask the current time-zone information for the specific network device identifier by shifting the current time-zone information for the specific network device identifier in the matching one of the presence profiles by an amount determined using a shifting algorithm;
  generate a presence update indicating the specific network device identifier, the current presence status, and the shifted time-zone information from the matching one of the presence profiles;
  identify a subscriber address for receiving the presence update; and
  transmit the presence update to the subscriber address.

2. The system of claim 1, wherein the shifting algorithm comprises randomization logic.

3. The system of claim 1, wherein:
 the database further comprises, for each of one or more of the presence profiles, one or more associated subscriber addresses each indicating a subscriber having requested updates for the presence profile; and
 the controller is further operable to identify the subscriber address by determining the associated subscriber addresses for the matching one of the presence profiles.

4. The system of claim 1, wherein the controller is further operable to identify the subscriber address based on receiving a request from the subscriber address for presence information.

5. The system of claim 1, wherein the controller is further operable to identify a category associated with the subscriber address, wherein the identified category indicates a type of presence information the subscriber is authorized to access, and wherein the controller is further operable to generate the presence update based on the identified category.

6. The system of claim 1, wherein the controller is further operable to:
 receive a request from a second subscriber address to receive presence information;
 determine the matching one of the presence profiles based on the request;
 verify authorization of the second subscriber address to receive presence updates for the matching presence profile; and associate the second subscriber address with the matching presence profile.

7. The system of claim 6, wherein the request identifies the network user associated with the matching presence profile, and the controller is further operable to determine the matching one of the presence profiles based on the identification of the network user.

8. The system of claim 1, wherein the shifting algorithm is operable to:
compare the current time-zone information to a plurality of time-zone blocks, wherein each time-zone block is associated with one or more time-zones, wherein at least one time-zone block is associated with a plurality of time-zones, and wherein each time-zone block has a representative time-zone value;
identify one of the plurality of time-zone blocks based on the comparison; and
determine the amount to shift the current time-zone by calculating the time difference between the current-time zone and the representative time-zone value for the identified one of the plurality of time-zone blocks.

9. The system of claim 8, wherein the plurality of time-zone blocks comprises a time-zone block associated with the United States.

10. A computer-implemented method for sharing presence-based time-zone information, using one or more processors, comprising:
storing a plurality of presence profiles, each presence profile maintaining, for an associated network user, one or more network device identifiers and, for each network device identifier, a current presence status, indicating network availability, and current time-zone information based on geographic location;
receiving presence information indicating a specific network device identifier, substantially real-time presence status, and substantially real-time time-zone information;
determining a matching one of the presence profiles having a network device identifier matching the specific network device identifier;
updating the current presence status and the current time-zone information for the specific network device identifier in the matching one of the presence profiles using the substantially real-time presence status and the substantially real-time time-zone information;
masking the current time-zone information for the specific network device identifier by shifting the current time-zone information for the specific network device identifier in the matching one of the presence profiles by an amount determined using a shifting algorithm;
generating a presence update indicating the specific network device identifier, the current presence status, and the shifted time-zone information from the matching one of the presence profiles;
identifying a subscriber address for receiving the presence update; and
transmitting the presence update to the subscriber address.

11. The method of claim 10, wherein the shifting algorithm comprises randomization logic.

12. The method of claim 10, further comprising:
storing, for each of one or more of the presence profiles, one or more associated subscriber addresses each indicating a subscriber having requested updates for the presence profile; and
identifying the subscriber address by determining the associated subscriber addresses for the matching one of the presence profiles.

13. The method of claim 10, further comprising identifying the subscriber address based on receiving a request from the subscriber address for presence information.

14. The method of claim 10, further comprising identifying a category associated with the subscriber address, wherein the identified category indicates a type of presence information the subscriber is authorized to access, and wherein the controller is further operable to generate the presence update based on the identified category.

15. The method of claim 10, further comprising:
receiving a request from a second subscriber address to receive presence information;
determining the matching one of the presence profiles based on the request;
verifying authorization of the second subscriber address to receive presence updates for the matching presence profile; and
associating the second subscriber address with the matching presence profile.

16. The method of claim 15, wherein the request identifies the network user associated with the matching presence profile, and the controller is further operable to determine the matching one of the presence profiles based on the identification of the network user.

17. The method of claim 10, wherein the shifting algorithm is operable to:
compare the current time-zone information to a plurality of time-zone blocks, wherein each time-zone block is associated with one or more time-zones, wherein at least one time-zone block is associated with a plurality of time-zones, and wherein each time-zone block has a representative time-zone value;
identify one of the plurality of time-zone blocks based on the comparison; and
determine the amount to shift the current time-zone by calculating the time difference between the current-time zone and the representative time-zone value for the identified one of the plurality of time-zone blocks.

18. The method of claim 17, wherein the plurality of time-zone blocks comprises a time-zone block associated with the United States.

19. Software for use in sharing presence-based time-zone information, the software embodied in one or more computer-readable media and, when executed using one or more processing modules, operable to:
store a plurality of presence profiles, each presence profile maintaining, for an associated network user, one or more network device identifiers and, for each network device identifier, a current presence status, indicating network availability, and current time-zone information based on geographic location;
receive presence information indicating a specific network device identifier, substantially real-time presence status, and substantially real-time time-zone information;
determine a matching one of the presence profiles having a network device identifier matching the specific network device identifier;
update the current presence status and the current time-zone information for the specific network device identifier in the matching one of the presence profiles using the substantially real-time presence status and the substantially real-time time-zone information;
mask the current time-zone information for the specific network device identifier by shifting the current time-zone information for the specific network device identifier in the matching one of the presence profiles by an amount determined using a shifting algorithm;

generate a presence update indicating the specific network device identifier, the current presence status, and the shifted time-zone information from the matching one of the presence profiles;

identify a subscriber address for receiving the presence update; and transmit the presence update to the subscriber address.

20. The software of claim 19, wherein the shifting algorithm comprises randomization logic.

21. The software of claim 19, further operable to:

store, for each of one or more of the presence profiles, one or more associated subscriber addresses each indicating a subscriber having requested updates for the presence profile; and identify the subscriber address by determining the associated subscriber addresses for the matching one of the presence profiles.

22. The software of claim 19, further operable to identify the subscriber address based on receiving a request from the subscriber address for presence information.

23. The software of claim 19, further operable to identify a category associated with the subscriber address, wherein the identified category indicates a type of presence information the subscriber is authorized to access, and wherein the controller is further operable to generate the presence update based on the identified category.

24. The software of claim 19, further operable to:

receive a request from a second subscriber address to receive presence information;

determine the matching one of the presence profiles based on the request;

verify authorization of the second subscriber address to receive presence updates for the matching presence profile; and associate the second subscriber address with the matching presence profile.

25. The software of claim 24, wherein the request identifies the network user associated with the matching presence profile, and the controller is further operable to determine the matching one of the presence profiles based on the identification of the network user.

26. The software of claim 19, wherein the shifting algorithm is operable to:

compare the current time-zone information to a plurality of time-zone blocks, wherein each time-zone block is associated with one or more time-zones, wherein at least one time-zone block is associated with a plurality of time-zones, and wherein each time-zone block has a representative time-zone value;

identify one of the plurality of time-zone blocks based on the comparison; and determine the amount to shift the current time-zone by calculating the time difference between the current-time zone and the representative time-zone value for the identified one of the plurality of time-zone blocks.

27. The software of claim 26, wherein the plurality of time-zone blocks comprises a time-zone block associated with the United States.

28. A system for sharing location information comprising:

a means for storing a plurality of presence profiles, each presence profile maintaining, for an associated network user, one or more network device identifiers and, for each network device identifier, a current presence status, indicating network availability, and current time-zone information based on geographic location;

a means for receiving presence information indicating a specific network device identifier, substantially real-time presence status, and substantially real-time time-zone information;

a means for determining a matching one of the presence profiles having a network device identifier matching the specific network device identifier;

a means for updating the current presence status and the current time-zone information for the specific network device identifier in the matching one of the presence profiles using the substantially real-time presence status and the substantially real-time time-zone information;

a means for masking the current time-zone information for the specific network device identifier by shifting the current time-zone information for the specific network device identifier in the matching one of the presence profiles by an amount determined using a shifting algorithm;

a means for generating a presence update indicating the specific network device identifier, the current presence status, and the shifted time-zone information from the matching one of the presence profiles;

a means for identifying a subscriber address for receiving the presence update; and a means for transmitting the presence update to the subscriber address.

* * * * *